US011358734B2

(12) United States Patent
Debrus et al.

(10) Patent No.: US 11,358,734 B2
(45) Date of Patent: Jun. 14, 2022

(54) ELECTROSTATIC DISCHARGE NOISE SUPPRESSION BY THE EARLY DISCHARGE OF A STEPPED METAL ELEMENT

(71) Applicant: SAINT-GOBAIN GLASS FRANCE, Courbevoie (FR)

(72) Inventors: Marie-Hélène Debrus, Dampierre en Burly (FR); Thomas Tondu, Sully (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 318 days.

(21) Appl. No.: 16/628,540

(22) PCT Filed: Jul. 6, 2018

(86) PCT No.: PCT/FR2018/051698
§ 371 (c)(1),
(2) Date: Jan. 3, 2020

(87) PCT Pub. No.: WO2019/008291
PCT Pub. Date: Jan. 10, 2019

(65) Prior Publication Data
US 2020/0216194 A1 Jul. 9, 2020

(30) Foreign Application Priority Data
Jul. 6, 2017 (FR) ...................................... 1700721

(51) Int. Cl.
 *B64C 1/14* (2006.01)
 *B64D 45/02* (2006.01)
 (Continued)

(52) U.S. Cl.
 CPC ................ *B64D 45/02* (2013.01); *B32B 7/12* (2013.01); *B32B 17/10045* (2013.01);
 (Continued)

(58) Field of Classification Search
 CPC . B64D 45/02; B64C 1/1492; B32B 17/10293; B32B 17/10376;
 (Continued)

(56) References Cited

U.S. PATENT DOCUMENTS 3,953,630 A     4/1976  Roberts et al.
8,471,177 B2 *  6/2013  Chaussade ........ B32B 17/10174
                                                       219/203

(Continued)

FOREIGN PATENT DOCUMENTS

EP     0 376 190 A2     7/1990
FR     2 888 082 A1     1/2007
JP     2000-286591 A1   10/2000

OTHER PUBLICATIONS

International Search Report as issued in International Patent Application No. PCT/FR2018/051698, dated Nov. 30, 2018.

Primary Examiner — Joanna Pleszczynska
(74) Attorney, Agent, or Firm — Pillsbury Winthrop Shaw Pittman LLP

(57) ABSTRACT

A laminated glazing includes a first and a second glass sheet that are bonded by a first interlayer adhesive layer, a peripheral zone of the laminated glazing being covered by a stepped metal element, a window press that is rigidly connected to the structure for mounting the laminated glazing making contact with the laminated glazing, so as to hold the laminated glazing secure to its mounting structure, an electrical conductor having a first end that is electrically linked to the stepped metal element and a second tapered end at a non-zero distance at most equal to 1 mm from the window press.

20 Claims, 1 Drawing Sheet

(51) Int. Cl.
 *B32B 17/10* (2006.01)
 *B32B 7/12* (2006.01)
(52) U.S. Cl.
 CPC .. *B32B 17/10293* (2013.01); *B32B 17/10376* (2013.01); *B32B 17/10761* (2013.01); *B64C 1/1492* (2013.01); *B32B 2605/006* (2013.01); *B32B 2605/18* (2013.01)
(58) Field of Classification Search
 CPC ........ B32B 17/10761; B32B 2605/006; B32B 2605/18; B32B 17/10045
 See application file for complete search history.

(56) References Cited

U.S. PATENT DOCUMENTS

| | | | |
|---|---|---|---|
| 9,598,166 B2* | 3/2017 | Yokoi | B64C 1/1492 |
| 2003/0062450 A1* | 4/2003 | Dazet | B64C 1/1492 |
| | | | 244/129.3 |
| 2010/0020381 A1* | 1/2010 | Legois | B32B 17/10495 |
| | | | 359/275 |
| 2013/0026296 A1 | 1/2013 | Yokoi et al. | |

\* cited by examiner

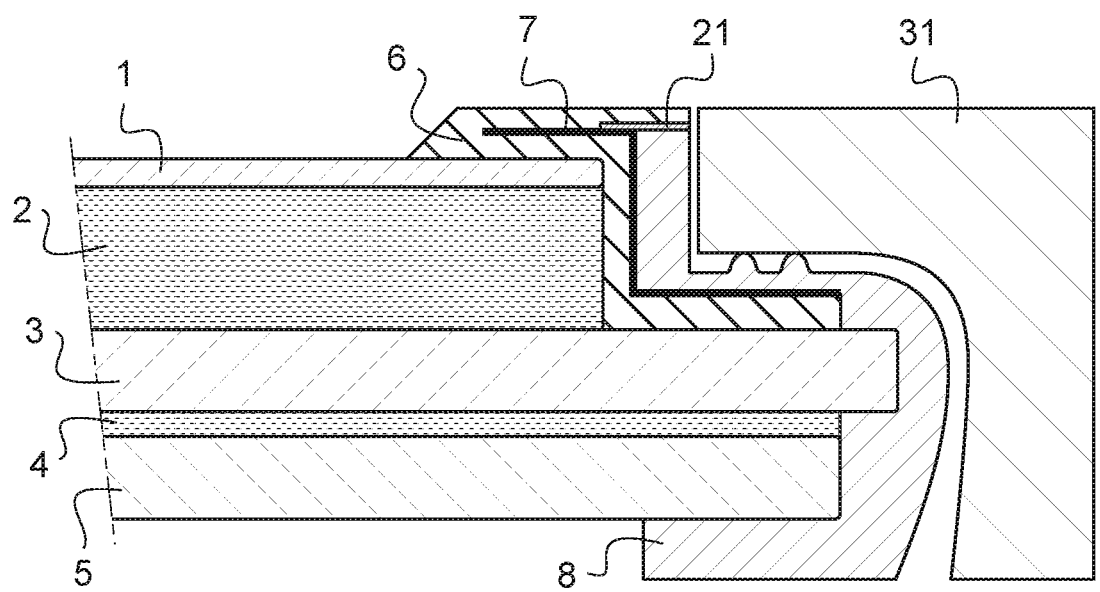

ELECTROSTATIC DISCHARGE NOISE SUPPRESSION BY THE EARLY DISCHARGE OF A STEPPED METAL ELEMENT

CROSS-REFERENCE TO RELATED APPLICATIONS

This application is the U.S. National Stage of PCT/FR2018/051698, filed Jul. 6, 2018, which in turn claims priority to French patent application number 1700721 filed Jul. 6, 2017. The content of these applications are incorporated herein by reference in their entireties.

Aircraft cockpit glazings are assemblies of mineral and/or organic glasses assembled together by lamination with interlayer adhesive layers. The penetration of water by diffusion through the interlayer adhesive layers may lead to faults in the laminated glazing, for example by promoting delamination or by damaging the electrical systems that are incorporated within the glazing.

A common counter to the penetration of moisture into the lamination interlayer adhesive layers consists in peripherally applying a conformal metal element to a peripheral zone of the laminated glazing, in particular a stepped metal element as will be seen hereinafter, which metal element is commonly referred to as a "zed" due to the shape of this strip.

This zed is bonded to the glass sheets of the laminated glazing and may be covered by an air- and watertight seal, for example made of silicone or equivalent, as well as by a "bead" (external seal) affording good durability and aerodynamic properties. This external seal is made of polysulfide or equivalent.

The metal zed is therefore located within silicone and polysulfide, and is electrically isolated from the internal electrical elements of the laminated glazing and from its mounting structure. It is electrically floating, and liable to carry electrostatic charge. It may be charged under certain flight conditions at potentials that differ substantially from those of the aircraft structure. The zed typically becomes charged due to flights through a charging environment: triboelectric charging through impacts with particles in the environment such as snow, ice, dust or pollution. Although the aircraft structure is fitted with discharging systems, elements such as the glazings, which are electrically isolated, accumulate charge.

In particular, the charge gathered by the glazing may be partly drained into the zed. Potentials allowing electrostatic discharges between the zed and the aircraft structure (or electrical systems incorporated within the glazing) may be reached.

This may result in
a sound signature startling the pilot;
a light signature (flash, sparks) startling the pilot;
an electromagnetic signature interfering with aircraft equipment.

The object of the invention is to keep the difference in potential between the zed and the structure for mounting a laminated glazing (aircraft structure, etc.) at a sufficiently low level, i.e. to prevent the occurrence of high discharge potentials, by promoting the occurrence of premature (low-energy) and localized electrostatic discharges such that they are inaudible.

This object is achieved by the invention, which consequently has as subject matter a laminated glazing comprising at least a first glass sheet forming an exterior face of the glazing, which first sheet is linked to a second glass sheet by a first interlayer adhesive layer, wherein the edge of the first glass sheet is set back with respect to that of the second, a peripheral portion of the free surface of the first glass sheet, the edge of this glass sheet, the edge of the first interlayer adhesive layer and a portion of the surface of the second glass sheet extending beyond the first glass sheet describing a continuous stepped contour which is covered by a stepped metal element, a window press that is rigidly connected to the structure for mounting the laminated glazing and the shape of which is substantially complementary to that of the continuous stepped contour making contact with the laminated glazing in the volume described by the continuous stepped contour, so as to hold the laminated glazing secure to its mounting structure, characterized in that an electrical conductor has a first end that is electrically linked to the stepped metal element and a second tapered end at a non-zero distance at most equal to 1 mm from the window press.

As mentioned above, the stepped metal element prevents moisture from penetrating into the lamination interlayer adhesive layers. It may be made of aluminium, stainless steel or other metal, and may interchangeably be referred to as the "zed" hereinafter.

The technical measures of the invention ensure a breakdown threshold that is at most equal to 1000 V.

According to preferred features of the laminated glazing of the invention:
the electrical conductor has, in the zone of its second end, a direction that is substantially perpendicular to a surface of the window press;
the electrical conductor comprises a metal wire having a diameter that is comprised between 20 and 50 µm; it may be made of copper, aluminum, tungsten or of another material;
the electrical conductor comprises a wire, such as one made of tungsten, that is stiff enough to ensure the orientation of its second end (with respect to the surface of the window press); this stiffness may also be such that it can ensure the orientation of the electrical conductor over its entire length, including during the formation of the external seal and of the leaktight seal described below, so as to ensure the relative positioning of the electrical conductor and of the stepped metal element; these three first preferred features of the laminated glazing of the invention are such that an electric arc between the electrical conductor and the aircraft structure (window press) can be initiated;
the electrical conductor comprises a single-stranded metal wire or a woven multistranded metal wire, such as a braided or grid-like conductor;
the laminated glazing comprises at least a third glass sheet that is linked to the second glass sheet by a second interlayer adhesive layer;
said continuous stepped contour is covered by the stepped metal element (or zed) with the interposition of an external seal, a portion of which is folded over the stepped metal element so as to afford the laminated glazing good durability and aerodynamic properties; the external seal is made of polysulfide or equivalent;
the stepped metal element is covered by an air- and watertight seal made of silicone or equivalent;
the electrical conductor is in contact with the stepped metal element; or else
the electrical conductor is embedded in the external seal, which consists of a sufficiently electrically conductive material, such as polysulfide; although remote from the stepped metal element, it is thus nonetheless electrically linked thereto by the electrical conduction of the external seal;

the electrical conductor may then be put into place at the time of formation of the external seal on the zed;

the electrical conductor protrudes or is flush with respect to the external seal and, if applicable, to the leaktight seal;

the first glass sheet is made of a mineral glass with a thickness of between 0.5 and 5 mm, preferably between 2 and 4 mm, or made of a polymer material such as poly(methyl methacrylate) (PMMA) with a thickness of between 0.5 and 5 mm;

the second glass sheet and, if applicable, the third glass sheet and so on are made of a mineral glass with a thickness of between 5 and 10 mm, or made of a polymer material such as poly(methyl methacrylate) (PMMA) with a thickness of between 5 and 30 mm, preferably at most 20 mm; these glass sheets are referred to as "structural folds";

the interlayer adhesive layers are made of polyurethane (PU), polyvinyl butyral (PVB), ethylene/vinyl acetate (EVA) or equivalent, the thickness of the first interlayer adhesive layer is between 3 and 10 mm, preferably 4 and 8 mm, and the thickness of the second interlayer adhesive layer and, if applicable, of the following layers is between 0.5 and 4 mm, preferably at most equal to 2 mm.

Another subject matter of the invention consists in the use of a laminated glazing described above as building, ground, air or water vehicle glazing, or glazing for street furniture, in particular as aircraft cockpit glazing. Aircraft cockpits may include two front glazings and two to four side glazings.

The invention will be better understood in light of the following description of the appended drawing. FIG. 1 is a schematic representation of a laminated glazing according to the invention.

In this example, a glass sheet refers to a chemically tempered aluminosilicate glass sheet, marketed by Saint-Gobain Sully under the Solidion® registered trademark.

With reference to FIG. 1, a laminated glazing comprises a first glass sheet 1 forming an exterior face of the glazing, having a thickness of 3 mm, which is bonded to a second glass sheet 3 having a thickness of 8 mm by a first polyvinyl butyral (PVB) interlayer adhesive layer 2 having a thickness of 5.3 mm.

A third glass sheet 5 having a thickness of 8 mm is bonded to the second 3 by a second polyvinyl butyral (PVB) interlayer adhesive layer 4 having a thickness of 2 mm.

The edge of the first glass sheet 1 is set back with respect to that of the second 3, a peripheral portion of the free surface of the first glass sheet 1, the edge of this glass sheet 1, the edge of the first interlayer adhesive layer 2 and a portion of the surface of the second glass sheet 3 extending beyond the first glass sheet 1 describing a continuous stepped contour which is covered by a stepped metal element 7 made of aluminum.

Said continuous stepped contour is covered by the stepped metal element 7 with the interposition of an external seal 6 made of polysulfide, a portion of which is folded over the stepped metal element 7 so as to afford the laminated glazing good durability and aerodynamic properties.

The stepped metal element 7 is covered by an air- and watertight seal 8 made of silicone.

The laminated glazing shown in FIG. 1 may be installed from the outside via a structure for mounting the laminated glazing, by bolting to the mounting structure a window press 31 covering the laminated glazing; this bolting may or may not result in the laminated glazing being pinched, the laminated glazing may also be bonded to the window press 31, and in any case held durably secure to the mounting structure. The window press 31 is a trim added from the outside.

Mounting from the inside is also possible. In this case, the shape of the window press mentioned above is present but forms an integral part of the mounting structure, and a trim (window press) is added from the inside. Bolting the inside window press and bonding the laminated glazing may be combined, with or without the laminated glazing being pinched.

With reference to FIG. 1, an electrical conductor 21 has been placed on the stepped metal element 7 at the time of formation of the external seal 6 (bead). The leaktight seal 8 has then been formed, such that the electrical conductor 21 is at the interface between the external seal 6 and the leak-tight seal 8. The electrical conductor 21 is flush with respect to the external seal 6 and to the leaktight seal 8; the distance from its second end to the surface of the window press 31 is 1 mm at most. It could equally protrude with respect to the external seal 6 and to the leaktight seal 8, the distance from its second end to the surface of the window press 31 also being 1 mm at most. The electrical conductor 21 defines, in particular in the zone thereof that is close to the window press 31, a direction that is substantially perpendicular to the surface of the latter 31.

No unwanted discharging of the zed, nor any disruptive noise signaling this discharge, are observed in the glazings according to the invention.

The invention claimed is:

1. A laminated glazing comprising at least a first glass sheet forming an exterior face of the glazing, which first glass sheet is linked to a second glass sheet by a first interlayer adhesive layer, wherein an edge of the first glass sheet is set back with respect to that of the second glass sheet, a peripheral portion of a free surface of the first glass sheet, the edge of the first glass sheet, an edge of the first interlayer adhesive layer and a portion of a surface of the second glass sheet extending beyond the first glass sheet describing a continuous stepped contour which is covered by a stepped metal element, a window press that is rigidly connected to a structure for mounting the laminated glazing and a shape of which is substantially complementary to that of the continuous stepped contour making contact with the laminated glazing in a volume described by the continuous stepped contour, so as to hold the laminated glazing secure to its mounting structure, wherein said continuous stepped contour is covered by the stepped metal element with the interposition of an external seal, wherein the stepped metal element is covered by an air- and watertight seal, and wherein an electrical conductor has a first end that is electrically linked to the stepped metal element and a second tapered end at a non-zero distance at most equal to 1 mm from the window press.

2. The laminated glazing as claimed in claim 1, wherein the electrical conductor has, in the zone of its second end, a direction that is substantially perpendicular to a surface of the window press.

3. The laminated glazing as claimed in claim 1, wherein the electrical conductor comprises a metal wire having a diameter that is comprised between 20 and 50 μm.

4. The laminated glazing as claimed in claim 3, wherein the electrical conductor comprises a wire that is stiff enough to ensure the orientation of its second end.

5. The laminated glazing as claimed in claim 1, wherein the electrical conductor comprises a single-stranded metal wire or a woven multistranded metal wire.

6. The laminated glazing as claimed in claim 1, further comprising at least a third glass sheet that is linked to the second glass sheet by a second interlayer adhesive layer.

7. The laminated glazing as claimed in claim 1, wherein a portion of the external seal is folded over the stepped metal element.

8. The laminated glazing as claimed in claim 1, wherein the electrical conductor is in contact with the stepped metal element.

9. The laminated glazing as claimed in claim 1, wherein the electrical conductor is embedded in the external seal.

10. The laminated glazing as claimed in claim 1, wherein the electrical conductor protrudes or is flush with respect to the external seal.

11. The laminated glazing as claimed in claim 1, wherein the first glass sheet is made of a mineral glass with a thickness of between 0.5 and 5 mm, or made of a polymer material with a thickness of between 0.5 and 5 mm.

12. The laminated glazing as claimed in claim 1, wherein the second glass sheet is made of a mineral glass with a thickness of between 5 and 10 mm, or made of a polymer material with a thickness of between 5 and 30 mm.

13. The laminated glazing as claimed in claim 1, wherein the first interlayer adhesive layer is made of polyurethane, polyvinyl butyral, or ethylene/vinyl acetate, wherein the thickness of the first interlayer adhesive layer is between 3 and 10 mm.

14. A method comprising utilizing a laminated glazing as claimed in claim 1 as building, ground, air or water vehicle glazing, or glazing for street furniture.

15. The method as claimed in claim 14, wherein the laminated glazing is an aircraft cockpit glazing.

16. The laminated glazing as claimed in claim 4, wherein the wire is made of tungsten.

17. The laminated glazing as claimed in claim 5, wherein the electrical conductor is a braided or grid-like conductor.

18. The laminated glazing as claimed in claim 9, wherein the external seal is made of polysulfide.

19. The laminated glazing as claimed in claim 11, wherein the thickness of the mineral glass is between 2 and 4 mm and the polymer material is poly(methyl methacrylate) (PMMA).

20. The laminated glazing as claimed in claim 12, wherein the polymer material is poly(methyl methacrylate) (PMMA) with a thickness of at most 20 mm.

* * * * *